Dec. 23, 1952 H. G. BECK 2,622,286
TRUNK SEAL GASKET
Filed Feb. 10, 1951

INVENTOR
Howard G. Beck
BY Evans + McCoy
ATTORNEYS

Patented Dec. 23, 1952

2,622,286

UNITED STATES PATENT OFFICE 2,622,286

TRUNK SEAL GASKET

Howard G. Beck, Irwin, Pa., assignor to The General Tire and Rubber Company, Akron, Ohio, a corporation of Ohio Application February 10, 1951, Serial No. 210,396

4 Claims. (Cl. 20—69)

The present invention relates to a novel linear gasket for the sealing of doors, trunk lids, and the like, and particularly to the sealing of the trunk lids of motor vehicles.

The usual gasket employed for sealing motor vehicle trunk lids against weather is a strip of rubber disposed around the edge portion of the trunk frame. Such strips must be bent or formed around relatively sharp corners in order to follow the contour of the lid, and at the same time not buckle or crinkle. Prior to the present invention, such strips were generally formed of sponge rubber because sponge rubber strips can easily be bent around sharp corners without serious buckling or crinkling. However, sponge rubber strips have the disadvantage of being porous and retaining moisture which causes rusting of the adjacent metal surfaces and promotes deterioration of the rubber. They are also considerably more expensive than extended rubber strips because they are more difficult to manufacture.

An object of this invention is to provide a new and improved sealing strip that can be bent around trunk corners and the like without crinkling or buckling and that, at the same time, forms a firm seal with the trunk lid.

Another object of this invention is to provide a rubber sealing strip that is less expensive to manufacture and is more impervious to moisture than the prior art sponge rubber strips.

Another object of the present invention is to provide a hollow molded sealing strip with interior reinforcement which will resist collapsing when the strip is bent to assembled form.

Other objects and advantages will appear from the following description and accompanying drawings in which like numerals refer to like parts:

Figure 1:
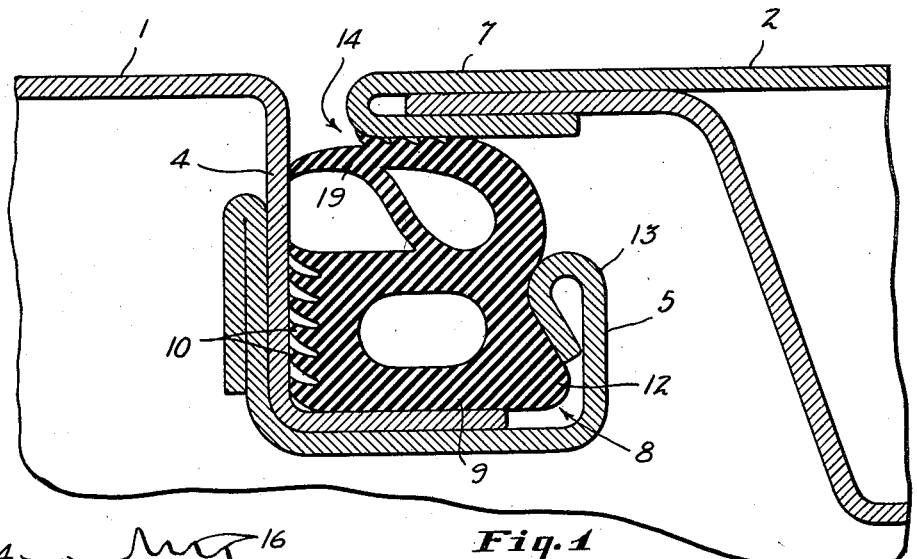
Figure 1 is a fragmentary cross-sectional view of the edge of a motor vehicle trunk opening showing the trunk lid in the closed position and sealed by the linear gasket of the present invention.

The invention is shown applied to a trunk frame 1 and trunk lid 2 of an automobile. The trunk frame surrounds the rear luggage compartment and includes a gasket support formed by a flanged edge portion 4 of the trunk frame and a channel member 5 welded or otherwise rigidly attached to the flanged edge portion. The trunk lid 2 has an edge or lip 7 which overlaps the gasket support and is exteriorly flush with the trunk frame 1. The trunk frame 1 and trunk lid 2 are formed of sheet metal as shown in the drawing. A gasket or sealing strip 8 of uniform cross-section fits into the channel-shaped gasket support of the trunk frame and forms a seal with the trunk lid.

As viewed in cross-section, this gasket 8 has a roughly rectangular base portion 9 and an integral, bulbous sealing portion 14. The base portion 9 has a series of longitudinal ribs or teeth 10 along one sidewall and a longitudinal, bulbous bead 12 adjacent the bottom on the opposite sidewall from the one with the longitudinal ribs. The base portion is preferably formed with a longitudinal central hollow therein, as shown in the drawing.

The ribs 10 on the gasket base portion 9 are relatively deep so that they will yield as shown in Fig. 1 when the gasket is forced into the channel shaped support of the trunk frame. This yielding provides a tight seal with the trunk frame and causes the ribs to grip or spring against one wall of the channel so that they strongly resist removal of the gasket. The bead 12 of the gasket fits under a lapped edge or bead 13 on the opposite side of the channel and also assists in holding the gasket tightly in the channel.

Figure 2:
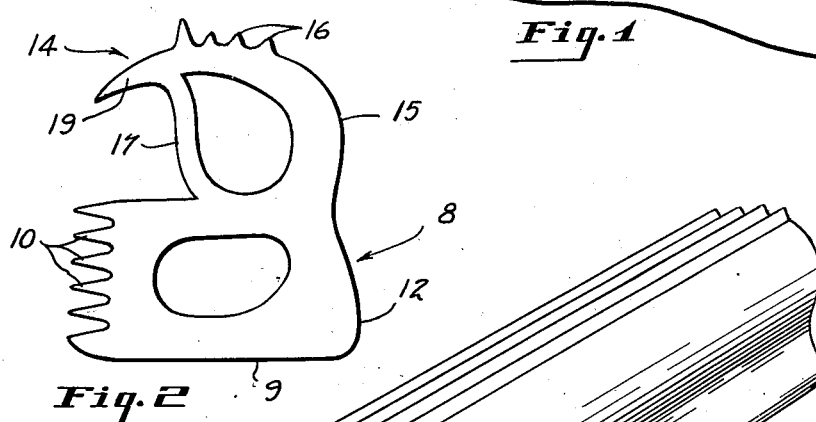
Fig. 2 is a cross-sectional view of the gasket in the unassembled form.
Figure 3:
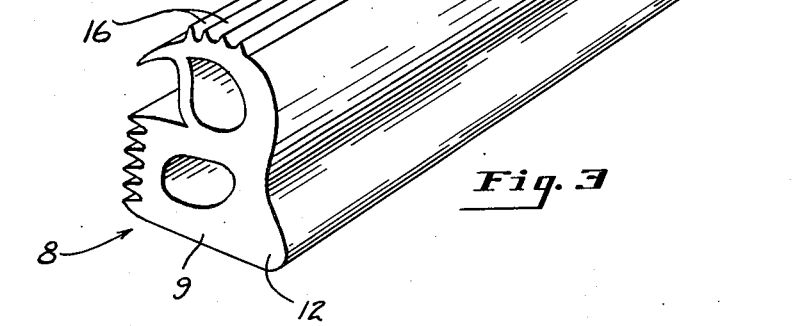
Fig. 3 is a perspective view of the linear gasket of the present invention as manufactured in strip form.

The sealing portion 14 of gasket 8 is bulbous, hollow, and integral with the base portion 9. This sealing portion is preferably shaped to more or less resemble a tear drop in cross-section, as shown, with the portion corresponding to the tail of the tear drop forming an integral lip 19. The inner and outer walls 15 and 17 of the sealing portion are inclined and converge to form the laterally-directed, flap-like edge or lip 19. This lip preferably terminates short of a vertical plane through the outer ends or tips of the ribs 10 on the base portion 9. The top or sealing face of the sealing portion 14 preferably has a series of longitudinal ribs or teeth 16 formed thereon. One tooth or rib may be larger than the others, as shown in Fig. 2.

When the trunk lid 2 is closed, the overhanging lip 7 of the lid engages or presses against the ribs 16 to make a seal therewith. At the same time, the wall 17 of the sealing portion 14 tends to buckle or collapse as the wall 15 of the sealing portion is bent downwardly by the trunk lid, whereby the lip 19 is pressed outwardly against the adjacent wall of the gasket supporting channel, forming a seal therewith, and assisting in holding the teeth 16 tightly against the lip 7 of the lid.

The gasket of this invention may readily be extruded to shape from rubber or rubber-like material and is readily bent around relatively sharp corners without noticeable buckling or crinkling, and it is readily pressed into place in supporting channels of the character described.

Though preferably mounted as shown in Fig. 1, the gasket may be mounted in various other ways in differently shaped channels or be reversed in its relationship with the inner and outer side walls of the channels. For example, the channel may be shaped to receive the bead 12 of the gasket in the opposite wall of the channel and the edge 13 of the channel may be turned in the opposite direction. With the gasket reversed, the lip 19 thereof will then be forced downwardly onto the channel edge 13 when the trunk lid is closed. Thus, it will be apparent that numerous variations may be made in the method of mounting the gasket without departing from the invention as defined in the appended claims.

Having described my invention, I claim:

1. A sealing strip of uniform cross-section of rubber-like material comprising a substantially rectangular base portion with a bulbous bead along one side adjacent the bottom face thereof and a series of longitudinal ribs along the opposite side thereof, a bulbous hollow sealing portion integrally formed on the top of said base portion with the side walls of said sealing portion converging to form a laterally directed lip.

2. The gasket of claim 1 in which the sealing portion has a series of longitudinal ribs along the top face thereof.

3. The gasket of claim 1 in which said laterally projecting lip extends laterally in the same direction as the longitudinal ribs on the side face of the base portion but terminates inwardly of the tips of said ribs.

4. The gasket of claim 1 in which the substantially rectangular base portion is formed with a central hollow therein.

HOWARD G. BECK.

REFERENCES CITED

The following references are of record in the file of this patent:

UNITED STATES PATENTS

| Number | Name | Date |
| --- | --- | --- |
| 2,093,727 | Julien | Sept. 21, 1937 |
| 2,156,681 | Dewhirst et al. | May 2, 1939 |
| 2,198,838 | Peltier | Apr. 30, 1940 |
| 2,214,222 | Chaffee | Sept. 10, 1940 |
| 2,379,193 | Shields | June 26, 1945 |
| 2,528,264 | Coppock et al. | Oct. 31, 1950 |